US011829618B2

(12) United States Patent
Rao et al.

(10) Patent No.: US 11,829,618 B2
(45) Date of Patent: Nov. 28, 2023

(54) MEMORY SUB-SYSTEM QOS POOL MANAGEMENT

(71) Applicant: Micron Technology, Inc., Boise, ID (US)

(72) Inventors: Abhijit Krishnamoorthy Rao, Bangalore (IN); Ashok Kumar Yadav, Bangalore (IN)

(73) Assignee: Micron Technology, Inc., Boise, ID (US)

( * ) Notice: Subject to any disclaimer, the term of this patent is extended or adjusted under 35 U.S.C. 154(b) by 132 days.

(21) Appl. No.: 17/467,101

(22) Filed: Sep. 3, 2021

(65) Prior Publication Data

US 2023/0073928 A1    Mar. 9, 2023

(51) Int. Cl.
G06F 3/06         (2006.01)
G06F 13/16        (2006.01)
G06F 13/42        (2006.01)

(52) U.S. Cl.
CPC .......... *G06F 3/0631* (2013.01); *G06F 3/0604* (2013.01); *G06F 3/0688* (2013.01); *G06F 13/1668* (2013.01); *G06F 13/4282* (2013.01); *G06F 2213/0026* (2013.01)

(58) Field of Classification Search
CPC .... G06F 3/0604; G06F 3/0631; G06F 3/0688; G06F 13/1668; G06F 13/4282; G06F 2213/0026
See application file for complete search history.

(56) References Cited

U.S. PATENT DOCUMENTS

| 6,654,363 | B1 | 11/2003 | Li et al. |
| 8,645,605 | B2 | 2/2014 | Subramaniyan et al. |
| 2003/0088685 | A1 | 5/2003 | Lee |
| 2007/0038750 | A1 | 2/2007 | Jorgensen |
| 2016/0034415 | A1 | 2/2016 | Singh et al. |
| 2016/0227111 | A1* | 8/2016 | Bretscher ............... H04N 19/62 |
| 2016/0299693 | A1* | 10/2016 | Sakdeo ............... G06F 11/3409 |
| 2018/0081832 | A1* | 3/2018 | Longo ..................... H04L 67/10 |
| 2022/0197773 | A1* | 6/2022 | Butler .................. H04N 21/234 |

OTHER PUBLICATIONS

Singh, S., Chana, I. Resource provisioning and scheduling in clouds: QoS perspective. J Supercomput 72, 926-960 (2016). https://doi.org/10.1007/s11227-016-1626-x (Year: 2016).*

Sukhpal Singh and Inderveer Chana. 2015. QoS-Aware Autonomic Resource Management in Cloud Computing: A Systematic Review. ACM Comput. Surv. 48, 3, Article 42 (Feb. 2016), 46 pages. https://doi.org/10.1145/2843889 (Year: 2016).*

A. Marchand, P. Balbastre, I. Ripoll and A. Crespo, "Providing Memory QoS Guarantees for Real-Time Applications," 2008 14th IEEE International Conference on Embedded and Real-Time Computing Systems and Applications, Kaohsiung, Taiwan, 2008, pp. 312-317, doi: 10.1109/RTCSA.2008.12. (Year: 2008).*

* cited by examiner

*Primary Examiner* — Eric T Oberly

(74) *Attorney, Agent, or Firm* — Brooks, Cameron & Huebsch, PLLC

(57) ABSTRACT

A method includes receiving a request for an allocation of memory resources based on quality of service (QoS) parameters. The method further includes provisioning, via a QoS manager component, a plurality of physical functions to provide the requested allocation of resources. At least two of the plurality of physical functions can be provided to meet a QoS criteria.

20 Claims, 7 Drawing Sheets

| BIT | FIELD | TYPE | DESC |
|---|---|---|---|
| 00 | Min QoS Availability | RO | Availability of QoS scale up is reserved (10% QoS scaleup) |
| 07:01 | Reserved | RO | Reserved |
| 15:08 | Max BW | RO | Max Available BW in units of 50MiB/s from QoS Pool in MBPS |
| 23:16 | Max IOPS | RO | Max Available IOPS in units of 12800 IOPS from QoS Pool |
| 30:24 | Reserve QoS% per PF | RO | Reserved QoS percentage per PF apart from QoS Pool |
| 31 | Reserved | RO | Reserved |

| BIT | FIELD | TYPE | DESC |
|---|---|---|---|
| 02:00 | QoS Option | RW | QoS scale up option as requested by host<br>04h: Assign 100% drive wide available QoS<br>03h: Assign 50% drive wide available QoS<br>02h: Assign 25% drive wide available QoS<br>01h: Assign 10% drive wide available QoS |
| 31:03 | Reserved | RO | Reserved |

FIG. 5B

MEMORY SUB-SYSTEM QOS POOL MANAGEMENT

TECHNICAL FIELD

Embodiments of the disclosure relate generally to memory sub-systems, and more specifically, relate to memory sub-system QOS pool management.

BACKGROUND

A memory sub-system can include one or more memory devices that store data. The memory devices can be, for example, non-volatile memory devices and volatile memory devices. In general, a host system can utilize a memory sub-system to store data at the memory devices and to retrieve data from the memory devices.

BRIEF DESCRIPTION OF THE DRAWINGS

The present disclosure will be understood more fully from the detailed description given below and from the accompanying drawings of various embodiments of the disclosure.

FIG. 5B is an example of data during management of QoS pools in accordance with embodiments of the present disclosure.

DETAILED DESCRIPTION

Figure 1:
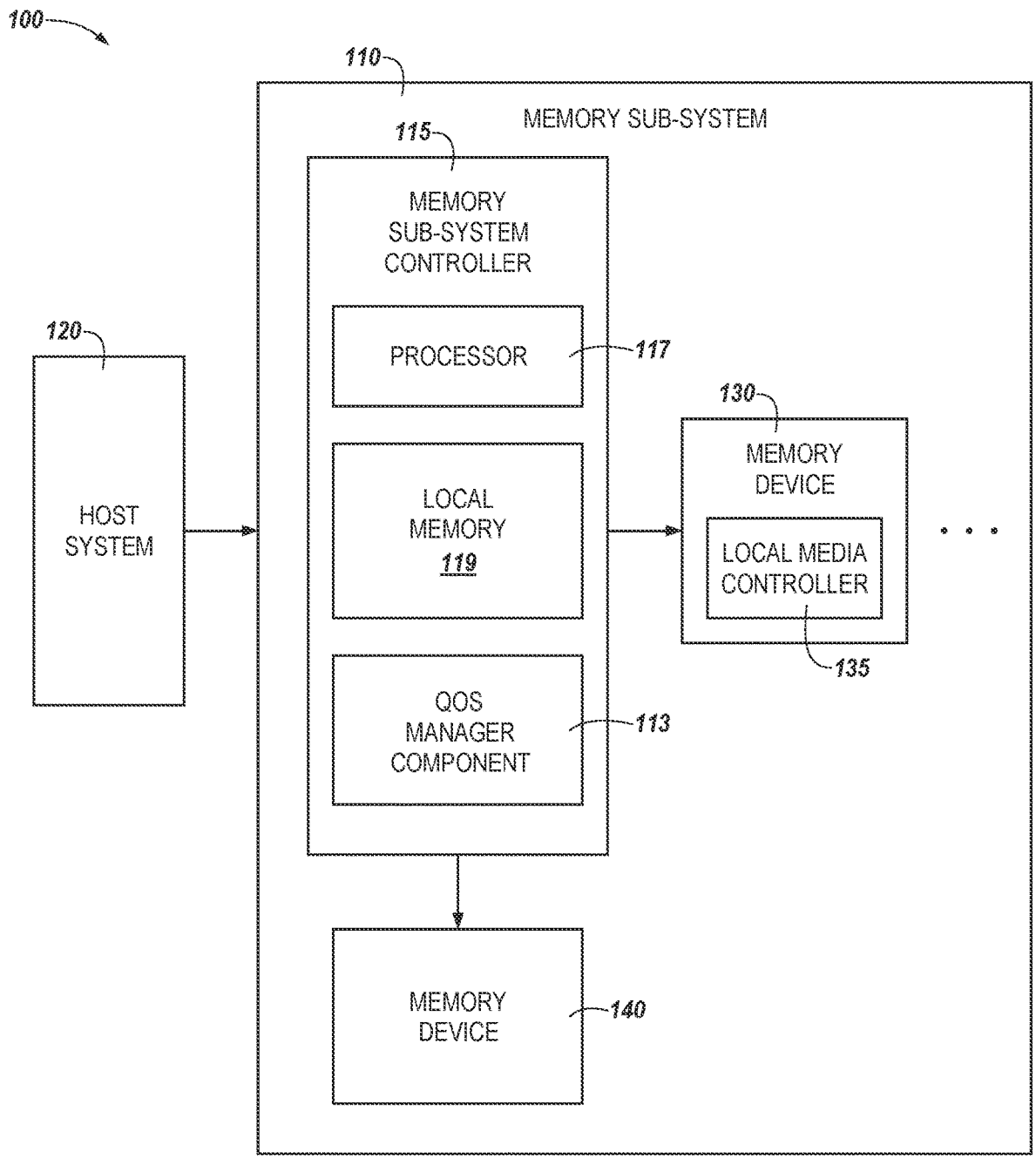
FIG. 1 illustrates an example computing system that includes a memory sub-system in accordance with some embodiments of the present disclosure.

Aspects of the present disclosure are directed to memory sub-system dynamic quality of service (QoS) pools, in particular to memory sub-systems that include a memory sub-system QoS manager component. A memory sub-system can be a storage system, storage device, a memory module, or a combination of such. An example of a memory sub-system is a storage system such as a solid-state drive (SSD). Examples of storage devices and memory modules are described below in conjunction with FIG. 1, et alibi. In general, a host system can utilize a memory sub-system that includes one or more components, such as memory devices that store data. The host system can provide data to be stored at the memory sub-system and can request data to be retrieved from the memory sub-system.

A memory device can be a non-volatile memory device. One example of a non-volatile memory device is a three-dimensional cross-point memory device that includes a cross-point array of non-volatile memory cells. Other examples of non-volatile memory devices are described below in conjunction with FIG. 1. A non-volatile memory device, such as a three-dimensional cross-point memory device, can be a package of one or more memory components (e.g., memory dice). Each die can consist of one or more planes. Planes can be grouped into logic units. For example, a non-volatile memory device can be assembled from multiple memory dice, which can each form a constituent portion of the memory device.

A memory device can be a non-volatile memory device. One example of non-volatile memory devices is a negative-and (NAND) memory device (also known as flash technology). Other examples of non-volatile memory devices are described below in conjunction with FIG. 1. A non-volatile memory device is a package of one or more dice. Each die can consist of one or more planes. Planes can be groups into logic units (LUN). For some types of non-volatile memory devices (e.g., NAND devices), each plane consists of a set of physical blocks. Each block consists of a set of pages. Each page consists of a set of memory cells ("cells"). A cell is an electronic circuit that stores information. A block hereinafter refers to a unit of the memory device used to store data and can include a group of memory cells, a word line group, a word line, or individual memory cells. For some memory devices, blocks (also hereinafter referred to as "memory blocks") are the smallest area than can be erased. Pages cannot be erased individually, and only whole blocks can be erased.

Each of the memory devices can include one or more arrays of memory cells. Depending on the cell type, a cell can store one or more bits of binary information, and has various logic states that correlate to the number of bits being stored. The logic states can be represented by binary values, such as "0" and "1", or combinations of such values. There are various types of cells, such as single level cells (SLCs), multi-level cells (MLCs), triple level cells (TLCs), and quad-level cells (QLCs). For example, a SLC can store one bit of information and has two logic states.

Some NAND memory devices employ a floating-gate architecture in which memory accesses are controlled based on a relative voltage change between the bit line and the word lines. Other examples of NAND memory devices can employ a replacement-gate architecture that can include the use of word line layouts that can allow for charges corresponding to data values to be trapped within memory cells based on properties of the materials used to construct the word lines.

During operation, a memory sub-system can use a multi-function PCIe storage device which, in some previous approaches, can provide performance of running an application using a physical function ("PF"). A multi-function PCIe storage device can expose itself as multiple standalone NVMe (non-volatile memory express) controllers to a host. An NVMe controller can be a host controller interface and storage protocol created to accelerate the transfer speed of data between enterprise and client systems and memory sub-systems (e.g., solid-state drives (SSDs)) over a computer's high-speed Peripheral Component Interconnect Express (PCIe) bus.

A physical function (PF) can be a PCIe function that can be discovered, enumerated, managed, and/or accessed like any other PCIe device. All physical functions can include a configuration space that specifies properties of the PCIe device and enables the host operating system (OS) or basic input output system (BIOS) to manage the specified properties. As an example, each of the physical functions can be recognized as an independent PCIe device that can be correlated to a non-volatile memory (NVM) namespace to make the physical function a PCIe device. A single PCIe based memory sub-system can host multiple physical functions that can each be seen as a separate controller within the single NVM memory sub-system. In some examples, each PF can be connected by a PCIe lane and whose bandwidth can be dependent on a PCIe interface.

In some approaches, a QoS of a single physical function can limit the performance of the application being run on the single physical function. The QoS capacity of an idle or unused physical function may remain unused due to a lack of an ability to provide the QoS functionality of that idle or unused physical function for use by an application. Therefore, the memory sub-system may remain underutilized and the ability to provide the most efficient QoS from each of the physical functions used can be limited. Further, a host can request information related to an amount of available memory resources or quality of service (QoS) availability. The host can query the memory sub-system each time the host is determining how much memory resource to request. The memory sub-system can respond upon receiving the request from the host. This can lead to repetitive communication between the host and the memory sub-system as the host has to continually request the information and the memory sub-system can be responding even though the availability or status of the memory resources have not changed.

Aspects of the present disclosure address the above and other deficiencies by creating groups of physical functions that can provide a QoS pool. Quality of service (QoS) refers to a description or measurement of overall performance of a service, such as a computing network or cloud computing service, and, particularly to a performance seen by a user of the network. To quantitatively measure the QoS, several related aspects of the network service are often considered, such as packet loss, bit rate, throughput, transmission delay, availability, jitter, etc. In some examples, QoS can also refer to an ability to provide different priorities to different applications, users, or flow of data, or to provide a certain level of performance to a data flow. A service level agreement (SLA) associated with an application can be provided on a QoS pool basis, using multiple physical functions that combine to provide a total QoS, instead of on a single physical function basis employed in some approaches. This can allow the memory sub-system to dedicate pools of high QoS physical functions to applications that exhibit higher performance by dynamically grouping the high QoS physical functions together within the memory sub-system.

As used herein, "dynamically" can refer to increasing or decreasing a group of QoS physical functions based on a request to use memory resources that consume a particular quantity of QoS during runtime of a computing system. As an example, a physical function with a particular QoS functionality can be dynamically added to a group of physical functions to provide a QoS pool and, likewise, a physical function with a particular QoS functionality that may no longer be needed can be dynamically removed from the QoS pool, each based on a particular physical function being used for a particular QoS used by a host or application. The functionality of these QoS pools can be provided using vendor specific commands. Further, these QoS pools can be dynamically changed by adding or removing physical functions with particular QoS parameters into or out of a particular QoS pool based on a corresponding SLA or other requests and performance provisions.

Further, aspects of the present disclosure address the above and other deficiencies by providing an approach for a host to request information related to memory resource availability without repetitive response between the host and the memory sub-system and without the memory sub-system having to respond when the memory resource availability has not changed. For example, the host can send a request message to the memory sub-system requesting a status indication related to memory resource availability. The memory sub-system can respond in response to a change in the memory resource or QoS availability (referred to as a QoS parameter change, as described below).

FIG. 1 illustrates an example computing system 100 that includes a memory sub-system 110 in accordance with some embodiments of the present disclosure. The memory sub-system 110 can include media, such as one or more volatile memory devices (e.g., memory device 140), one or more non-volatile memory devices (e.g., memory device 130), or a combination of such.

A memory sub-system 110 can be a storage device, a memory module, or a hybrid of a storage device and memory module. Examples of a storage device include a solid-state drive (SSD), a flash drive, a universal serial bus (USB) flash drive, an embedded Multi-Media Controller (eMMC) drive, a Universal Flash Storage (UFS) drive, a secure digital (SD) card, and a hard disk drive (HDD). Examples of memory modules include a dual in-line memory module (DIMM), a small outline DIMM (SO-DIMM), and various types of non-volatile dual in-line memory modules (NVDIMMs).

The computing system 100 can be a computing device such as a desktop computer, laptop computer, server, network server, mobile device, a vehicle (e.g., airplane, drone, train, automobile, or other conveyance), Internet of Things (IoT) enabled device, embedded computer (e.g., one included in a vehicle, industrial equipment, or a networked commercial device), or such computing device that includes memory and a processing device.

The computing system 100 can include a host system 120 that is coupled to one or more memory sub-systems 110. In some embodiments, the host system 120 is coupled to different types of memory sub-system 110. FIG. 1 illustrates one example of a host system 120 coupled to one memory sub-system 110. As used herein, "coupled to" or "coupled with" generally refers to a connection between components, which can be an indirect communicative connection or direct communicative connection (e.g., without intervening components), whether wired or wireless, including connections such as electrical, optical, magnetic, and the like.

The host system 120 can include a processor chipset and a software stack executed by the processor chipset. The processor chipset can include one or more cores, one or more caches, a memory controller (e.g., an SSD controller), and a storage protocol controller (e.g., PCIe controller, SATA controller). The host system 120 uses the memory sub-system 110, for example, to write data to the memory sub-system 110 and read data from the memory sub-system 110.

The host system 120 can be coupled to the memory sub-system 110 via a physical host interface. Examples of a physical host interface include, but are not limited to, a serial advanced technology attachment (SATA) interface, a peripheral component interconnect express (PCIe) interface, universal serial bus (USB) interface, Fibre Channel, Serial Attached SCSI (SAS), Small Computer System Interface (SCSI), a double data rate (DDR) memory bus, a dual in-line memory module (DIMM) interface (e.g., DIMM socket interface that supports Double Data Rate (DDR)), Open NAND Flash Interface (ONFI), Double Data Rate (DDR), Low Power Double Data Rate (LPDDR), or any other interface. The physical host interface can be used to transmit data between the host system 120 and the memory sub-system 110. The host system 120 can further utilize an NVM Express (NVMe) interface to access components (e.g., memory devices 130) when the memory sub-system 110 is coupled with the host system 120 by the PCIe interface. The physical host interface can provide an interface for passing control, address, data, and other signals between the memory sub-system 110 and the host system 120. FIG. 1 illustrates a memory sub-system 110 as an example. In general, the host system 120 can access multiple memory sub-systems via a same communication connection, multiple separate communication connections, and/or a combination of communication connections.

The memory devices 130, 140 can include any combination of the different types of non-volatile memory devices and/or volatile memory devices. The volatile memory devices (e.g., memory device 140) can be, but are not limited to, random access memory (RAM), such as dynamic random-access memory (DRAM) and synchronous dynamic random access memory (SDRAM).

Some examples of non-volatile memory devices (e.g., memory device 130) include negative-and (NAND) type flash memory and write-in-place memory, such as three-dimensional cross-point ("3D cross-point") memory device, which is a cross-point array of non-volatile memory cells. A cross-point array of non-volatile memory can perform bit storage based on a change of bulk resistance, in conjunction with a stackable cross-gridded data access array. Additionally, in contrast to many flash-based memories, cross-point non-volatile memory can perform a write in-place operation, where a non-volatile memory cell can be programmed without the non-volatile memory cell being previously erased. NAND type flash memory includes, for example, two-dimensional NAND (2D NAND) and three-dimensional NAND (3D NAND).

Each of the memory devices 130, 140 can include one or more arrays of memory cells. One type of memory cell, for example, single level cells (SLC) can store one bit per cell. Other types of memory cells, such as multi-level cells (MLCs), triple level cells (TLCs), quad-level cells (QLCs), and penta-level cells (PLC) can store multiple bits per cell. In some embodiments, each of the memory devices 130 can include one or more arrays of memory cells such as SLCs, MLCs, TLCs, QLCs, or any combination of such. In some embodiments, a particular memory device can include an SLC portion, and an MLC portion, a TLC portion, a QLC portion, or a PLC portion of memory cells. The memory cells of the memory devices 130 can be grouped as pages that can refer to a logical unit of the memory device used to store data. With some types of memory (e.g., NAND), pages can be grouped to form blocks.

Although non-volatile memory components such as three-dimensional cross-point arrays of non-volatile memory cells and NAND type memory (e.g., 2D NAND, 3D NAND) are described, the memory device 130 can be based on any other type of non-volatile memory or storage device, such as such as, read-only memory (ROM), phase change memory (PCM), self-selecting memory, other chalcogenide based memories, ferroelectric transistor random-access memory (FeTRAM), ferroelectric random access memory (FeRAM), magneto random access memory (MRAM), Spin Transfer Torque (STT)-MRAM, conductive bridging RAM (CBRAM), resistive random access memory (RRAM), oxide based RRAM (OxRAM), negative-or (NOR) flash memory, and electrically erasable programmable read-only memory (EEPROM).

The memory sub-system controller 115 (or controller 115 for simplicity) can communicate with the memory devices 130 to perform operations such as reading data, writing data, or erasing data at the memory devices 130 and other such operations. The memory sub-system controller 115 can include hardware such as one or more integrated circuits and/or discrete components, a buffer memory, or a combination thereof. The hardware can include digital circuitry with dedicated (i.e., hard-coded) logic to perform the operations described herein. The memory sub-system controller 115 can be a microcontroller, special purpose logic circuitry (e.g., a field programmable gate array (FPGA), an application specific integrated circuit (ASIC), etc.), or other suitable processor.

The memory sub-system controller 115 can include a processor 117 (e.g., a processing device) configured to execute instructions stored in a local memory 119. In the illustrated example, the local memory 119 of the memory sub-system controller 115 includes an embedded memory configured to store instructions for performing various processes, operations, logic flows, and routines that control operation of the memory sub-system 110, including handling communications between the memory sub-system 110 and the host system 120.

In some embodiments, the local memory 119 can include memory registers storing memory pointers, fetched data, etc. The local memory 119 can also include read-only memory (ROM) for storing micro-code. While the example memory sub-system 110 in FIG. 1 has been illustrated as including the memory sub-system controller 115, in another embodiment of the present disclosure, a memory sub-system 110 does not include a memory sub-system controller 115, and can instead rely upon external control (e.g., provided by an external host, or by a processor or controller separate from the memory sub-system).

In general, the memory sub-system controller 115 can receive commands or operations from the host system 120 and can convert the commands or operations into instructions or appropriate commands to achieve the desired access to the memory device 130 and/or the memory device 140. The memory sub-system controller 115 can be responsible for other operations such as wear leveling operations, garbage collection operations, error detection and error-correcting code (ECC) operations, encryption operations, caching operations, and address translations between a logical address (e.g., logical block address (LBA), namespace) and a physical address (e.g., physical block address, physical media locations, etc.) that are associated with the memory devices 130. The memory sub-system controller 115 can further include host interface circuitry to communicate with the host system 120 via the physical host interface. The host interface circuitry can convert the commands received from the host system into command instructions to access the memory device 130 and/or the memory device 140 as well as convert responses associated with the memory device 130 and/or the memory device 140 into information for the host system 120.

The memory sub-system 110 can also include additional circuitry or components that are not illustrated. In some embodiments, the memory sub-system 110 can include a cache or buffer (e.g., DRAM) and address circuitry (e.g., a row decoder and a column decoder) that can receive an address from the memory sub-system controller 115 and decode the address to access the memory device 130 and/or the memory device 140.

In some embodiments, the memory device 130 includes local media controllers 135 that operate in conjunction with memory sub-system controller 115 to execute operations on one or more memory cells of the memory devices 130. An external controller (e.g., memory sub-system controller 115) can externally manage the memory device 130 (e.g., perform media management operations on the memory device 130). In some embodiments, a memory device 130 is a managed memory device, which is a raw memory device combined with a local controller (e.g., local controller 135) for media management within the same memory device package. An example of a managed memory device is a managed NAND (MNAND) device.

The memory sub-system 110 can include a quality of service (QoS) manager component 113. Although not shown in FIG. 1 so as to not obfuscate the drawings, the QoS manager component 113 can include various circuitry, firmware, and/or software to facilitate monitoring, control, and status updates related to QoS parameters for a memory sub-system and/or components of the memory sub-system, determining whether to perform QoS operations for the memory sub-system and/or components of the memory sub-system based on service level agreements (SLAs), data usage, data requirements of an application, etc., of the memory sub-system and/or components of the memory sub-system, and/or controlling pools of physical functions (PFs) for QoS operations for the memory sub-system and/or the components of the memory sub-system. In some embodiments, the QoS manager component 113 can include special purpose circuitry in the form of an ASIC, FPGA, state machine, and/or other logic circuitry that can allow the QoS manager component 113 to orchestrate and/or perform operations to selectively perform QoS operations for the memory device 130 and/or the memory device 140 based on determined SLA and/or QoS requests, requirements, etc. and data usage parameters.

In some embodiments, the memory sub-system controller 115 includes at least a portion of the QoS manager component 113. For example, the memory sub-system controller 115 can include a processor 117 (processing device) configured to execute instructions stored in local memory 119 for performing the operations described herein. In some embodiments, the QoS manager component 113 is part of the host system 110, an application, or an operating system.

In a non-limiting example, an apparatus (e.g., the computing system 100) can include a memory sub-system QoS manager component 113. The memory sub-system QoS manager component 113 can be resident on the memory sub-system 110. As used herein, the term "resident on" refers to something that is physically located on a particular component. For example, the memory sub-system QoS manager component 113 being "resident on" the memory sub-system 110 refers to a condition in which the hardware circuitry that comprises the memory sub-system QoS manager component 113 is physically located on the memory sub-system 110. The term "resident on" can be used interchangeably with other terms such as "deployed on" or "located on," herein.

The memory sub-system QoS manager component 113 can be configured to determine a QoS pool for a group of physical functions (PFs) for allocating QoS services for usage of memory components of the memory sub-system and determine that a particular QoS pool is allocated for use by a user based on SLAs, application requirements, etc. As described above, the memory components can be memory dice or memory packages that form at least a portion of the memory device 130. A QoS pool can be formed by aggregating QoS parameters allotted to multiple individual PFs and by forming dynamic, or changeable, QoS pools during run-time. This can be similar to a cluster of PFs where once a QoS parameter is determine, the SLA is based on the QoS pool and not on a capability (for example, an input/output per second (IOPS) or bandwidth (BW)) of an individual PF. The QoS pool can have an upper and lower criteria based on QoS parameters or numbers. The QoS configuration can be set to a standard configuration on a first boot up and can subsequently be changed based on an SLA requirement of an application. For example, the application can be ensured to run using a QoS pool capable of running the application and meeting the SLA requirements to do so. As a further example, the application or group of applications can be correlated to a PF, whereas the PF by itself is not limited by its initial QoS parameters. The QoS pool, on behalf of the PF, can increase or decrease capability based on the QoS pool capabilities and changing demand to acquire higher IOPS and BW parameters of the QoS pool (and thereby more than one PF).

In some embodiments, a PF can be assigned a bandwidth (BW) and input/output per second (IOPS) quantities, the upper criterion and the lower criterion of the QoS parameters being dependent on the QoS pool of PFs. The QoS manager component 113 can monitor and control the division of the QoS parameters across the PFs in the QoS pool of PFs. The QoS manager component 113 can be notified via a vendor specific application programming interface (API) by the application which is associated with the PF for improved QoS parameters. The QoS manager component 113 can provision higher QoS parameters to a particular PF in the QoS pool that needs higher QoS parameters to perform (e.g., to perform according to the SLA).

In some embodiments, the QoS manager component 113 can receive a request from a host (e.g., the host system 120) to provide an indication of a status of the QoS parameters available. The request can be sent from the host in order for the host to determine whether to request additional QoS parameters for the QoS pool that is currently allocated or whether to maintain a current QoS parameter setup. The QoS manager component 113 can receive the request message and store the request message in a queue or location for response once a particular criteria is met. For example, the criteria can include a change in the QoS parameters, such as an increase or decrease of usage of a QoS parameter in a different QoS pool or of an unused physical function that has not been allocated to a particular QoS pool. In this way, the QoS manager component 113 can delay the response until the response has useful information (i.e., the response indicates more than that the status of the QoS parameters is the same). The host can receive the status change indication and can determine what to request in relation to a QoS parameter update, as will be described further below.

Figure 2:
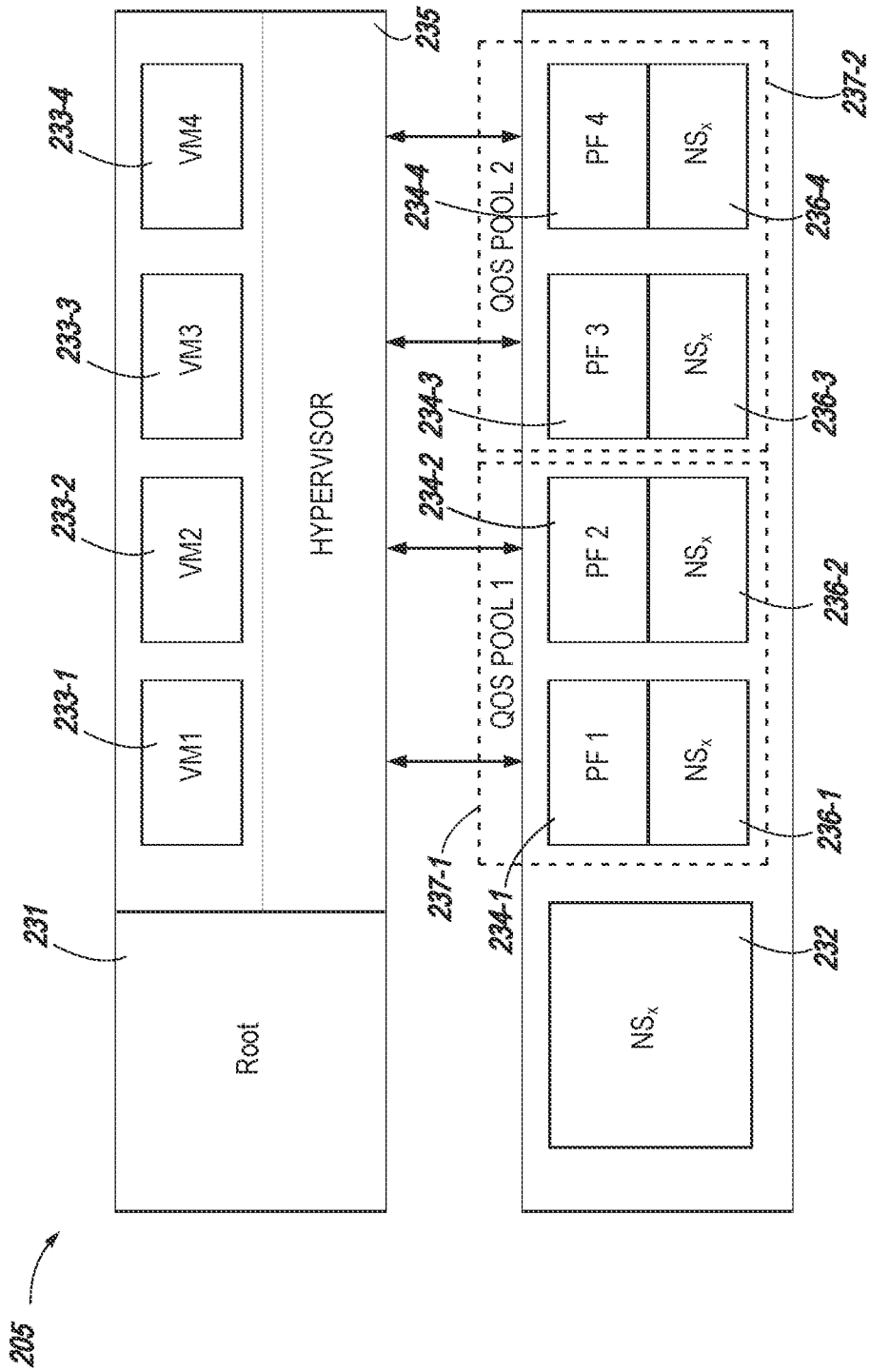
FIG. 2 is a block diagram of an example computing system including QoS pools in accordance with some embodiments of the present disclosure.

FIG. 2 is a block diagram of an example computing system 205 including QoS pools 237-1, 237-2 in accordance with some embodiments of the present disclosure. The computing system 205 can include a root component 231, multiple virtual machines (VMs) 233-1, 233-2, 233-3, 233-4 (hereinafter referred to collectively as plurality of VMs 233), and a hypervisor 235. The root component 231 can refer to a device driver in the host (e.g., the host system 120 illustrated in FIG. 1, herein) that can send privileged commands to manage physical functions, such the physical functions 234 described below. This device driver can send a command to each of the physical functions. The hypervisor 235 can be hardware, software, and/or firmware capable of creating and/or running virtual machines, such as the VMs 233, and managing and allocating the resources of the VMs 233. In the example shown in FIG. 2, the VMs 233 are machines set up to use resources of the host (such as the host system 120 in FIG. 1).

Multiple physical functions (PFs) 234-1, 234-2, 234-3, 234-4 (hereinafter referred to collectively the PFs 234) can be allocated to each of the VMs 233 based on QoS requests or demands by a user. Each of the PFs 234 can be connected to a particular non-volatile memory namespace, such as namespaces ("NS$_x$") 236-1, 236-2, 236-3, 236-4. For example, PF1 234-1 can be connected to namespace 236-1, PF2 234-2 can be connected to namespace 236-2, etc. The namespace 232 can be associated with an admin controller and can be used to send privileged admin commands and is managed by an admin controller in the device (e.g., PF 0). The admin controller can receive privileged admin commands from a device driver that enables management of other physical functions. However, embodiments are not so limited. For example, in some embodiments, namespaces are removed and not used for sending admin commands.

In some previous approaches where a QoS manager component is not present, a VM (such as VM 233-1) can be associated with a single PF (such as PF1 234-1) and the QoS parameters of the single PF are the QoS resources allocated to the corresponding VM. In this way, in the situation where a VM (such as VM2 233-2) is not being used, the PF (such as PF2 234-2) and its associated QoS resources of the unused VM may not be allocated to an additional VM (such as VM 2 233-2). However, in the description provided herein, a QoS Pool 1 237-1 that includes both PF1 234-1 and PF2 234-2 can use the QoS resources of both PF1 234-1 and/or PF2 234-2 and provide the QoS resources of either or both to a single VM, such as VM1 233-1 or VM2 233-2. In this way, a QoS pool 1 237-1 and its associated QoS resources can be allocated to a VM and a second QoS pool 2 237-2 and its associated QoS resources can be allocated to an additional VM. A QoS manager component (such as QoS manager component 113 in FIG. 1.) can manage, monitor, and modify the QoS pools. For example, as will be described in association with FIG. 3 below, a PF can be added or deleted from a QoS pool in order to meet a particular SLA or QoS resource demands.

Figure 3:
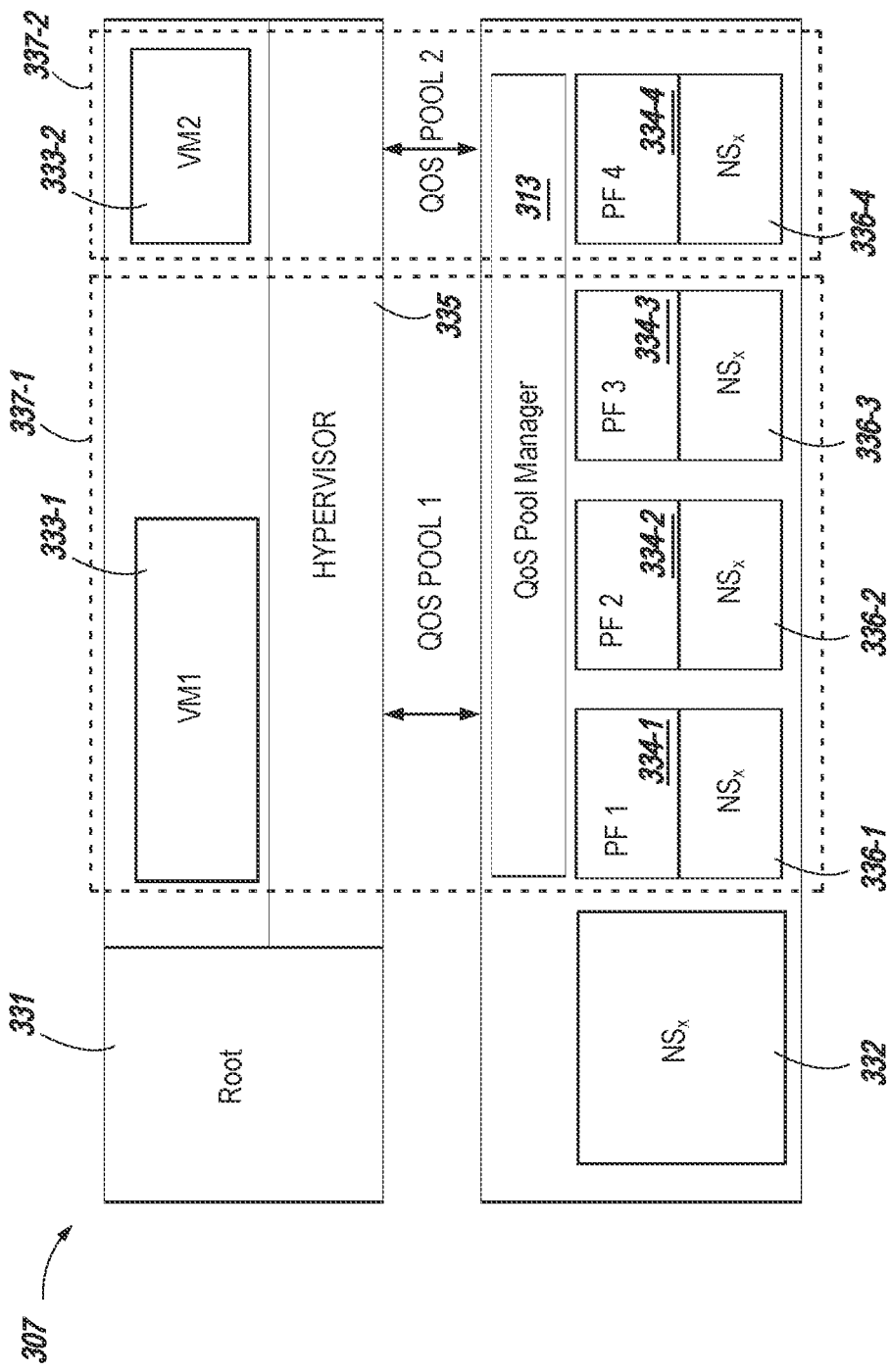
FIG. 3 is a block diagram of an example computing system including QoS pools in accordance with embodiments of the present disclosure.

FIG. 3 is a block diagram of an example computing system 307 including QoS pools 337-1, 337-2 in accordance with some embodiments of the present disclosure. The computing system 307 can include a root component 331, multiple virtual machines (VMs) 333-1, 333-2 (hereinafter referred to collectively as plurality of VMs 333), and a hypervisor 335. The root component 331 can refer to a device driver in the host that can send privileged commands to manage physical functions, such as plurality of physical functions 234 described below. This device driver can send a command to each of the physical functions. The hypervisor 335 can be hardware, software, and/or firmware capable of creating and/or running virtual machines, such as the VMs 333, and managing and allocating resources of the VMs 333. The VMs 333 are machines set up to use resources of the host (such as host system 120 in FIG. 1).

Multiple physical functions (PFs) 334-1, 334-2, 334-3, 334-4 (hereinafter referred to collectively the PFs 334) can be allocated to each of the VMs 333 based on QoS requests or demands by a user. Each of the PFs 334 can be connected to a particular non-volatile memory namespace, such as namespaces ("NS$_x$") 336-1, 336-2, 336-3, 336-4. For example, PF1 334-1 can be connected to namespace 336-1, PF2 334-2 can be connected to namespace 336-2, etc. The namespace 332 can be associated with an admin controller and can be used to send privileged admin commands and is managed by an admin controller in the device (e.g., PF 0). The admin controller can receive privileged admin commands from a device driver that enables management of other physical functions. However, embodiments are not so limited. For example, in some embodiments, namespaces are removed and not used for sending admin commands.

In some embodiments, as is illustrated in FIG. 3, a QoS Pool 1 337-1 that includes PF1 334-1, PF2 334-2, and PF3 334-3 can use the QoS resources of the three PFs 334-1, 334-2, 334-3 and provide the QoS resources of the three PFs to VM1 333-1 while QoS Pool 2 337-2 and its QoS resources of PF4 334-4 is provided to VM2 333-2 either or both to a single VM, such as VM1 233-1 or VM2 233-2. In this way, a QoS pool 1 337-1 with greater QoS resources can be provided to a VM, such as VM1 333-1, with greater QoS demands or requests. Likewise, a QoS Pool 2 337-2 with fewer QoS resources can be provide to a VM, such as VM2 333-2, with fewer QoS demands or requests.

In some embodiments, a PF can be added or removed from a QoS pool. For example, the transition from QoS Pool 1 237-1 of FIG. 2 to QoS Pool 1 337-1 of FIG. 3 can include adding PF3 234-3 to QoS Pool 1 237-1 and removing PF3 234-3 from QoS Pool 2 237-2, resulting in what is illustrated in FIG. 3, and its associated QoS resources can be allocated to a VM and a second QoS pool 2 237-2 and its associated QoS resources can be allocated to an additional VM. A QoS manager component (such as QoS manager component 113 in FIG. 1) can manage, monitor, and modify the QoS pools. For example, a PF can be added or deleted from a QoS pool in order to meet a particular SLA or QoS resource demands.

Such an addition or removal can occur if an inactive PF is available outside a QoS pool and another VM may be able to use the QoS resources of the inactive PF. In this way, the inactive PF can be added to a different QoS pool that is active and its QoS capacity can be transferred to the active QoS pool that may require a higher QoS parameter. In some examples, an application can request generation of a pool of PFs that can be combined to form a particular QoS pool. The application can view this pool as a high performing QoS pool whose QoS is higher than any individual PF. An application can communicate with the QoS manager component 313 using vendor specific API which informs the QoS manager component 313 of the dynamic QoS needs of each application. In some examples, this does not require the system to be stopped and restarted and can instead be performed during runtime of the system. As a host workload varies over time, particular PFs may remain unused for brief or extended periods of time. Inclusion of unused QoS resources in QoS pools can allow for greater improvement in QoS distribution for PFs which may anticipate higher workloads, thus resulting in a better use of otherwise idle QoS resources.

Figures 4, 5A:
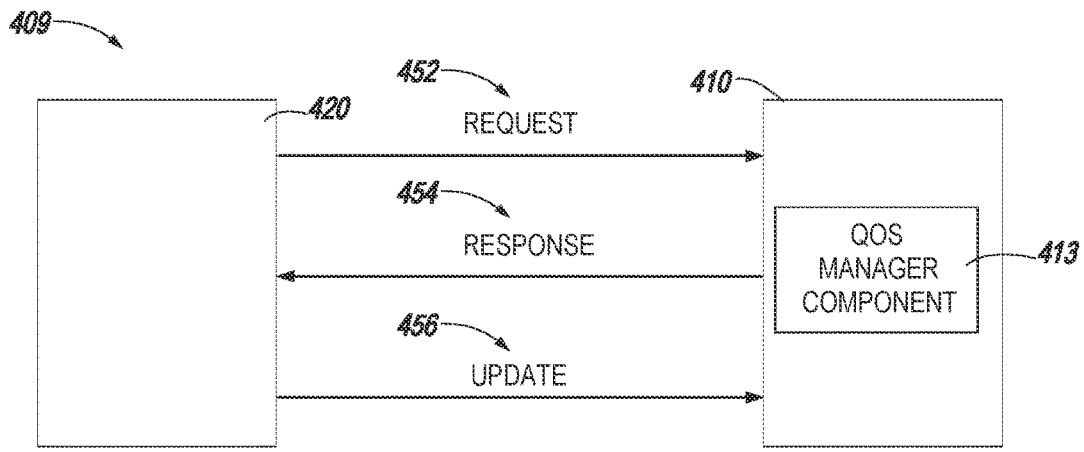
FIG. 4 is a block diagram of an example computing method for managing QoS pools in accordance with embodiments of the present disclosure.
FIG. 5A is an example of data during management of QoS pools in accordance with embodiments of the present disclosure.

FIG. 4 is a block diagram of an example method 409 for managing QoS pools in accordance with embodiments of the present disclosure. The method 409 can be performed by processing logic that can include hardware (e.g., processing device, circuitry, dedicated logic, programmable logic, microcode, hardware of a device, integrated circuit, etc.), software (e.g., instructions run or executed on a processing device), or a combination thereof. In some embodiments, the method 409 is performed by the host 420, which can be analogous to host system 120 in FIG. 1, and the QoS manager component 413, which can be analogous to QoS manager component 113 of FIG. 1. Although shown in a particular sequence or order, unless otherwise specified, the order of the processes can be modified. Thus, the illustrated embodiments should be understood only as examples, and the illustrated processes can be performed in a different order, and some processes can be performed in parallel. Additionally, one or more processes can be omitted in various embodiments. Thus, not all processes are required in every embodiment. Other process flows are possible.

At operation 452, the host 420 can request an indication of a status update related to QoS parameters from the memory subsystem 410. The QoS manager component 413 of the memory subsystem 410 can monitor usage of the QoS parameters and the allocation of QoS pools, as described above. At operation 454, the QoS manager component 413 can provide a response to the host 420, indicating the status of the QoS parameters. In this example, the response can be sent in response to a change in the status of the QoS parameters. In this way, the host 420 and the memory sub-system 410 can be more efficient in their communication in comparison to the approaches described above.

At operation 456, the host 420 can send an update message requesting allocation of a different set of QoS parameters based on the provided status. For example, the response at operation 454 may indicate that there are additional QoS parameters available and the host 420 may have use for those additional QoS parameters and request them in the update. Further, the host 420 may request fewer QoS parameters based on a time or cost sharing agreement where the host 420 may determine it is more cost effective to lower its usage. This example may occur if the status indicates there are few QoS parameters available and there is a discount or refund related to a decrease in QoS parameters during a situation of QoS parameter need by the memory sub-system 410. However, examples are not so limited.

FIG. 5A is an example of a data structure 511-1 during management of QOS pools in accordance with embodiments of the present disclosure. The data structure 511-1 is a representation of a QoS log and its corresponding fields in the QoS log. The fields of the QoS log represent a state of a memory system or memory device (e.g., memory device 130 or 140 from FIG. 1) from a perspective of performance scale up availability. In some examples, the data structure 511-1 can be a vendor-specific data structure. The QoS log of the data structure 511-1 can be sent from a memory device upon host request. The host can determine based on the QoS log what amount of quantity of QoS to use or request after assessing the content of the QoS log.

The data structure 511-1 can be an example of the response 454 in FIG. 4, described above. The data structure 511-1 can include columns of information including bit information 557-1, field information 557-2, a type indication 557-3, and a description 557-4. The bit information 557-1 describes a number of bits used to represent this field. For example, "00" indicates bit "0" and uses a single bit. The illustration of "07:01" indicates bit 1 up to bit 7 and uses 7 bits. Out of a total of 32 bits, the corresponding allocation of bits is indicated by this bit information column 557-1. The field information column 557-2 describes why the bits in the bit information 557-1 are being allocated. The type indication column 557-3 is illustrated as "RO" which stands for read-only and indicates that the host receiving the QoS log is not able to change the QoS log. The description column 557-4 describes additional information.

The data structure 511-1 can include rows of information including minimum QoS availability 559-1, reserved 559-2, a maximum available bandwidth 559-3 (in units of 50 MiB/s from QoS pool in MBPS), a maximum input/output per second (IOPS) 559-4 (in units of 12,800 IOPS from QoS pool), a reserved QoS percentage per physical function 559-5, and Reserved 559-6. The information provided by this response can indicate to the host a status of the QoS parameters being used, percentage of use per QoS pool, etc. The reserved 559-6 indication can refer to a reserved field in the log whose bits are reserved for future use.

In order to receive the QoS log illustrated in data structure 511-1, a host can send a request for QoS availability. The memory device can respond when there is a change in QoS availability based on a current state of the memory device (which can be referred to as "device hinting"). By the memory device responding only when there is a change, the host can avoid repetitive requests by waiting until there is a response because the memory device will respond only when there is a change. Upon receiving the response from the memory device with the QoS changes, the host can request the QoS log. The memory device can send the QoS log to the host. The host can use the QoS log to request a new QoS from the memory device.

FIG. 5B is an example of a data structure 511-2 during management of QOS pools in accordance with embodiments of the present disclosure. The data structure 511-2 can include the same information of bits 557-1, fields, 557-2, type 557-3, and description 557-4 and include options of QoS parameter availability for selection by a host. For example, a first row 558-1 can include a type 557-3 of "RW" and can describes the options of which can, in this example, include 100% of drive-wide QoS availability, 50% availability, 25% availability, and 10% availability. If one of the options is not chosen, the QoS manager component (e.g., the QoS manager component 413 in FIG. 4) can assign a next available option possible and respond via a completion entry of the option chosen. Further, for example, a second row 558-2 can include a read-only type ("RO") 557-3.

Figure 6:
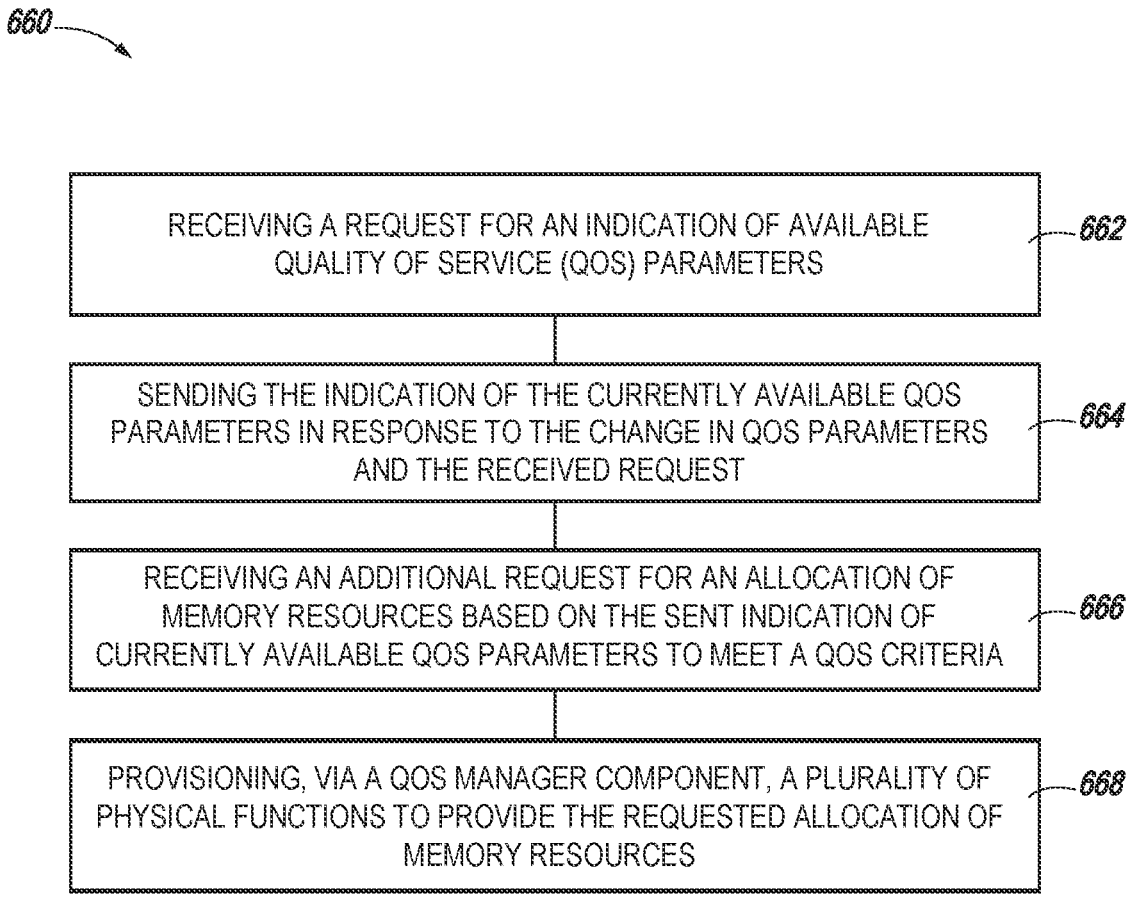
FIG. 6 is an example method for managing QoS pools in accordance with embodiments of the present disclosure.

FIG. 6 is flow diagram corresponding to a method 660 for arrangement of memory dies arrangement in accordance with some embodiments of the present disclosure. The method 660 can be performed by processing logic that can include hardware (e.g., processing device, circuitry, dedicated logic, programmable logic, microcode, hardware of a device, integrated circuit, etc.), software (e.g., instructions run or executed on a processing device), or a combination thereof. In some embodiments, the method 660 is performed by the QoS manager component 113 of FIG. 1. Although shown in a particular sequence or order, unless otherwise specified, the order of the processes can be modified. Thus, the illustrated embodiments should be understood only as examples, and the illustrated processes can be performed in a different order, and some processes can be performed in parallel. Additionally, one or more processes can be omitted in various embodiments. Thus, not all processes are required in every embodiment. Other process flows are possible.

At operation 662, a request for an indication of available QoS parameters can be received. The request can be sent by a host and received by a memory sub-system, as described above. The request can be sent in order to determine which QoS parameters are available or in use by other devices or applications. The request can be received at a QoS manager component of the memory sub-system. In some embodiments, the QoS manager component can be analogous to QoS manager component 113 in FIG. 1. The QoS parameters can include at least one of an input/output per second (IOPS) rate of data and/or a bandwidth and the QoS criteria can be a threshold quantity of the IOPS and/or bandwidth.

At operation 664, an indication of the currently available QoS parameters can be sent in response to a change in the QoS parameters and in response to receiving the prior request. The indication can be sent in a return message to the host. The initial request from the host can be stored or delayed until a change in the QoS parameters occurs. Further, the indication can provide percentages of use, quantities of QoS parameters being used, etc., as is described above.

At operation 666, an additional request for allocation of memory resources or QoS parameters based on the sent indication of currently available QoS parameters can be received. The additional request for allocation of memory resources can be sent in order to meet a QoS criteria. As an example, a host may use more QoS parameters if allocated and, in response to an indication that there are more QoS parameters available to use, can request allocation of those QoS parameters to meet that higher QoS usage.

At operation 668, a multiple physical functions (PFs) can be provisioned via the QoS manager component, to provide the requested allocation of memory resources or QoS parameters. The PFs can be provisioned as a QoS pool of memory resources. In some embodiments, the method 660 can include updating the provision of the physical functions by adding an additional physical function to the QoS pool of memory resources. The additional physical function can be added to the QoS pool of memory resources in response to fewer memory resources being used to satisfy the QoS parameters. In some embodiments, the method 660 can include updating the provision of the physical functions by removing an additional physical function from the QoS pool of memory resources. The additional physical function is removed from the QoS pool of memory resources in response to more memory resources being used to satisfy the QoS parameters. The method 660 can further include a period of time that occurs between the received request for the indication of available QoS parameters and when the indication of the currently available QoS parameters is sent.

Figure 7:
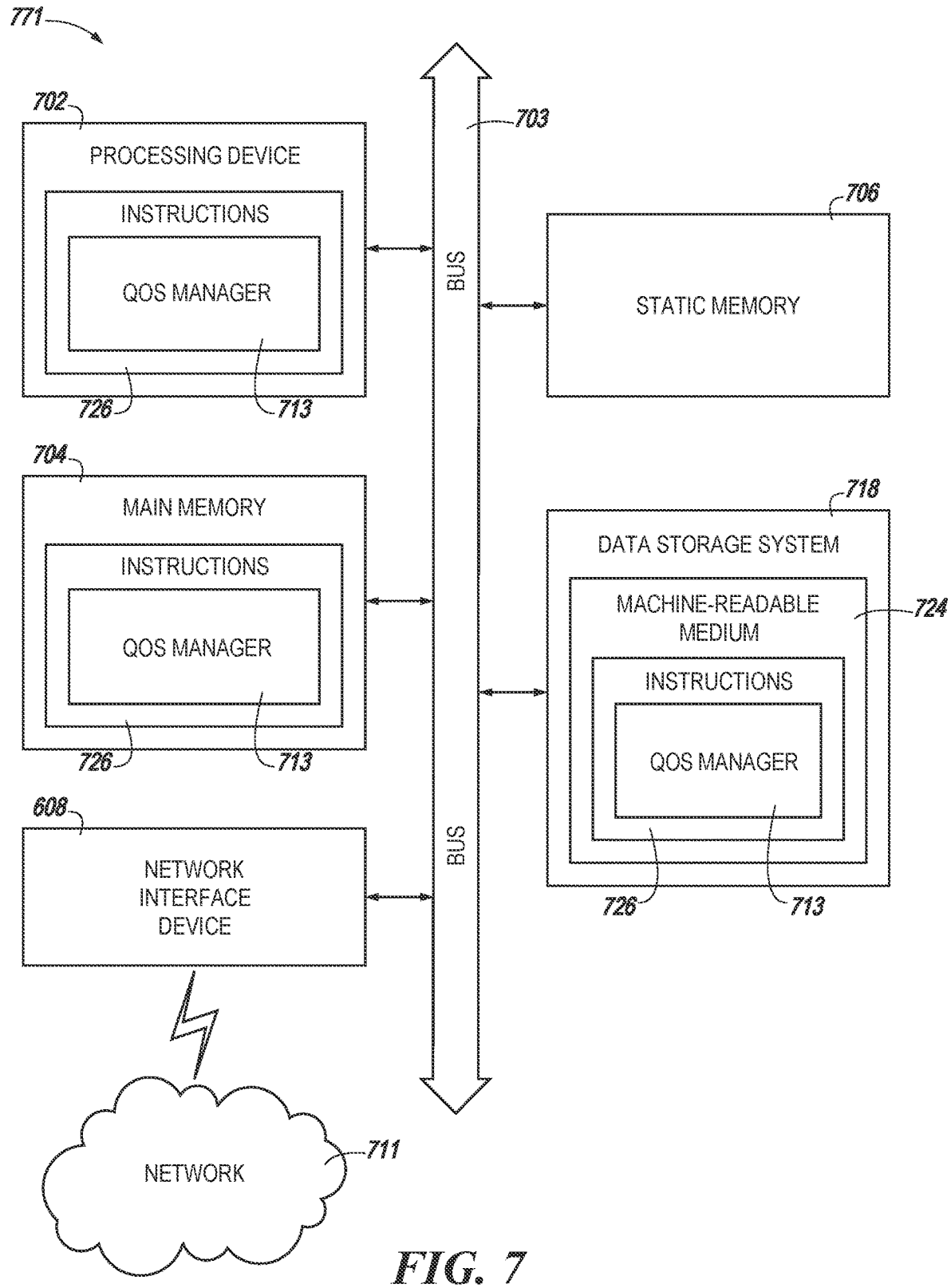
FIG. 7 is an example computer system for managing QoS pools in accordance with embodiments of the present disclosure.

FIG. 7 is a block diagram of an example computer system 561 in which embodiments of the present disclosure may operate. For example, FIG. 7 illustrates an example machine of a computer system 771 within which a set of instructions, for causing the machine to perform any one or more of the methodologies discussed herein, can be executed. In some embodiments, the computer system 771 can correspond to a host system (e.g., the host system 120 of FIG. 1) that includes, is coupled to, or utilizes a memory sub-system (e.g., the memory sub-system 110 of FIG. 1) or can be used to perform the operations of a controller (e.g., to execute an operating system to perform operations corresponding to the QoS manager component 113 of FIG. 1). In alternative embodiments, the machine can be connected (e.g., networked) to other machines in a LAN, an intranet, an extranet, and/or the Internet. The machine can operate in the capacity of a server or a client machine in client-server network environment, as a peer machine in a peer-to-peer (or distributed) network environment, or as a server or a client machine in a cloud computing infrastructure or environment.

The machine can be a personal computer (PC), a tablet PC, a set-top box (STB), a Personal Digital Assistant (PDA), a cellular telephone, a web appliance, a server, a network router, a switch or bridge, or any machine capable of executing a set of instructions (sequential or otherwise) that specify actions to be taken by that machine. Further, while a single machine is illustrated, the term "machine" shall also be taken to include any collection of machines that individually or jointly execute a set (or multiple sets) of instructions to perform any one or more of the methodologies discussed herein.

The example computer system 771 includes a processing device 702, a main memory 704 (e.g., read-only memory (ROM), flash memory, dynamic random access memory (DRAM) such as synchronous DRAM (SDRAM) or Rambus DRAM (RDRAM), etc.), a static memory 706 (e.g., flash memory, static random access memory (SRAM), etc.), and a data storage system 718, which communicate with each other via a bus 730.

The processing device 702 represents one or more general-purpose processing devices such as a microprocessor, a central processing unit, or the like. More particularly, the processing device can be a complex instruction set computing (CISC) microprocessor, reduced instruction set computing (RISC) microprocessor, very long instruction word (VLIW) microprocessor, or a processor implementing other instruction sets, or processors implementing a combination of instruction sets. The processing device 702 can also be one or more special-purpose processing devices such as an application specific integrated circuit (ASIC), a field programmable gate array (FPGA), a digital signal processor (DSP), network processor, or the like. The processing device 702 is configured to execute instructions 726 for performing the operations and steps discussed herein. The computer system 771 can further include a network interface device 508 to communicate over the network 708.

The data storage system 718 can include a machine-readable storage medium 724 (also known as a computer-readable medium) on which is stored one or more sets of instructions 726 or software embodying any one or more of the methodologies or functions described herein. The instructions 726 can also reside, completely or at least partially, within the main memory 704 and/or within the processing device 702 during execution thereof by the computer system 761, the main memory 704 and the processing device 702 also constituting machine-readable storage media. The machine-readable storage medium 724, data storage system 718, and/or main memory 704 can correspond to the memory sub-system 110 of FIG. 1.

In one embodiment, the instructions 726 include instructions to implement functionality corresponding to a QoS manager component (e.g., the QoS manager component 113 of FIG. 1). While the machine-readable storage medium 724 is shown in an example embodiment to be a single medium, the term "machine-readable storage medium" should be taken to include a single medium or multiple media that store the one or more sets of instructions. The term "machine-readable storage medium" shall also be taken to include any medium that is capable of storing or encoding a set of instructions for execution by the machine and that cause the machine to perform any one or more of the methodologies of the present disclosure. The term "machine-readable storage medium" shall accordingly be taken to include, but not be limited to, solid-state memories, optical media, and magnetic media.

Some portions of the preceding detailed descriptions have been presented in terms of algorithms and symbolic representations of operations on data bits within a computer memory. These algorithmic descriptions and representations are the ways used by those skilled in the data processing arts to most effectively convey the substance of their work to others skilled in the art. An algorithm is here, and generally, conceived to be a self-consistent sequence of operations leading to a desired result. The operations are those requiring physical manipulations of physical quantities. Usually, though not necessarily, these quantities take the form of electrical or magnetic signals capable of being stored, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. The present disclosure can refer to the action and processes of a computer system, or similar electronic computing device, that manipulates and transforms data represented as physical (electronic) quantities within the computer system's registers and memories into other data similarly represented as physical quantities within the computer system memories or registers or other such information storage systems.

The present disclosure also relates to an apparatus for performing the operations herein. This apparatus can be specially constructed for the intended purposes, or it can include a general purpose computer selectively activated or reconfigured by a computer program stored in the computer. Such a computer program can be stored in a computer readable storage medium, such as, but not limited to, any type of disk including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions, each coupled to a computer system bus.

The algorithms and displays presented herein are not inherently related to any particular computer or other apparatus. Various general purpose systems can be used with programs in accordance with the teachings herein, or it can prove convenient to construct a more specialized apparatus to perform the method. The structure for a variety of these systems will appear as set forth in the description below. In addition, the present disclosure is not described with reference to any particular programming language. It will be appreciated that a variety of programming languages can be used to implement the teachings of the disclosure as described herein.

The present disclosure can be provided as a computer program product, or software, that can include a machine-readable medium having stored thereon instructions, which can be used to program a computer system (or other electronic devices) to perform a process according to the present disclosure. A machine-readable medium includes any mechanism for storing information in a form readable by a machine (e.g., a computer). In some embodiments, a machine-readable (e.g., computer-readable) medium includes a machine (e.g., a computer) readable storage medium such as a read only memory ("ROM"), random access memory ("RAM"), magnetic disk storage media, optical storage media, flash memory devices, etc.

In the foregoing specification, embodiments of the disclosure have been described with reference to specific example embodiments thereof. It will be evident that various modifications can be made thereto without departing from the broader spirit and scope of embodiments of the disclosure as set forth in the following claims. The specification and drawings are, accordingly, to be regarded in an illustrative sense rather than a restrictive sense.

What is claimed is:

1. A method, comprising:
   receiving a request for an indication of when an increase of quality of service (QoS) parameters is available;
   in response to the increase of the QoS parameters becoming available, sending, via a QoS manager component, the indication of the availability of the increase of the QoS parameters based on a change in the QoS parameters and receiving the request;
   receiving an additional request for an allocation of memory resources based on the sent indication of the availability of the increase of the QoS parameters to meet a QoS criteria; and
   provisioning, via the QoS manager component, a plurality of physical functions to provide the allocation of memory resources requested;
   wherein at least two of the plurality of physical functions are provided to meet the QoS criteria.

2. The method of claim 1, wherein a period of time occurs between the received request for the indication of available QoS parameters and the indication of the currently available QoS parameters being sent.

3. The method of claim 1, wherein the QoS parameters comprise an input/output per second (IOPS) rate of data or a bandwidth, or both.

4. The method of claim 1, wherein the plurality of physical functions are provisioned as a QoS pool of memory resources.

5. The method of claim 1, wherein the change in QoS parameters comprises an additional physical function of a QoS pool of memory resources becoming available.

6. The method of claim 1, wherein the change in QoS parameters comprises a portion of QoS resources of a particular physical function of a QoS pool being de-allocated.

7. An apparatus, comprising:
   a memory sub-system quality of service (QoS) manager component to perform operations comprising:
      allocating a QoS pool comprising a plurality of physical functions to provide a QoS capacity of memory resources, wherein each of the plurality of physical functions comprise a portion of QoS capacity that adds to a total QoS capacity of the QoS pool;
      monitoring a quality of service (QoS) usage of each of the plurality of physical functions within the allocated QoS pool;
      receiving a request for an indication of when an increase of quality of service (QoS) parameters is available;
      in response to the of increase of the QoS parameters becoming available, sending the indication of the availability of the increase of the QoS parameters based on a change in the QoS parameters, the received request, and the monitored QoS usage;
      receiving an additional request for an allocation of an additional QoS pool to provide the currently available QoS parameters based on the sent indication; and
      dynamically adding at least one physical function to the plurality of physical functions of the QoS pool to result in the additional QoS pool being allocated in response to receiving the request for the allocation of the additional QoS pool.

8. The apparatus of claim 7, wherein the QoS capacity comprises an input/output per second (IOPS) rate or a bandwidth (BW), or both.

9. The apparatus of claim 8, wherein the IOPS rate or the BW, or both, is set for each of the plurality of physical functions.

10. The apparatus of claim 7, wherein the memory sub-system QoS manager component is to perform operations comprising allocating the QoS pool in response to receiving a request to allocate the QoS pool to provide the QoS capacity.

11. The apparatus of claim 8, wherein the QoS manager component is to perform operations comprising altering at least one of the IOPS or the BW, or both during runtime for a particular one of the plurality of physical functions using vendor specific commands.

12. The apparatus of claim 7, wherein the QoS manager component is to perform operations comprising allocating the QoS pool based on a service level agreement (SLA) per each of the plurality of physical functions and wherein the SLA is based on a QoS criteria being met.

13. The apparatus of claim 7, wherein the QoS manager component is to perform operations comprising maintaining a same allocation of the QoS pool until the availability of QoS parameters has changed and the request for an allocation of an additional QoS pool is received.

14. The apparatus of claim 7, wherein the QoS manager component is to perform operations comprising maintaining a physical function not allocated in the QoS pool as an unused physical function.

15. The apparatus of claim 14, wherein the QoS manager component is to perform operations comprising indicating a QoS parameter of the unused physical function is available when sending the indication of the currently available QoS parameters.

16. A system, comprising:
a plurality of memory components; and
a processing device coupled to the plurality of memory components, the processing device to perform operations comprising:
allocating a QoS pool comprising a first set of a plurality of physical functions to provide a QoS capacity of memory resources, wherein each of the first set of the plurality of physical functions comprise a portion of QoS capacity that adds to a total QoS capacity of the QoS pool;
monitoring:
a QoS usage of the first set of the plurality of physical functions within the QoS pool; and
a QoS usage of a second set of the plurality of physical functions within an additional QoS pool;
receiving a request for an indication of currently available quality of service (QoS) parameters;
in response to the availability of QoS parameters changing, sending the indication of the currently available QoS parameters in response to the change in QoS parameters and the received request, wherein the changing of the QoS parameters comprises the QoS usage of the second set decreasing;
receiving an additional request for an allocation of an additional QoS parameter into the QoS pool to provide the currently available QoS parameters based on the sent indication; and
dynamically adding at least one physical function from the second set to the first set of the QoS pool in response to receiving the request for the allocation of the additional QoS parameter.

17. The system of claim 16, wherein the processing device is to perform operations comprising removing an unused physical function from the second set of the plurality of physical functions.

18. The system of claim 16, wherein the allocation of the first set of the plurality of physical functions comprises allocating a plurality of namespaces of a memory subsystem.

19. The system of claim 16, wherein the memory components are within a multi-function peripheral component interconnect express (PCIe) storage device.

20. The system of claim 19, wherein:
the multi-function PCIe storage device is accessed as multiple non-volatile memory controllers; and
PCIe functions of the multi-function PCIe storage device are within a single physical memory device.

* * * * *